Sept. 4, 1956

H. F. GEISLER ET AL 2,761,479

MEAT RECOVERY APPARATUS FOR COOKED POULTRY NECKS

Filed March 31, 1953

INVENTOR.
HAROLD F. GEISLER,
JOHN R. THOMPSON,
BY
McMorrow, Berman & Davidson
ATTORNEYS.

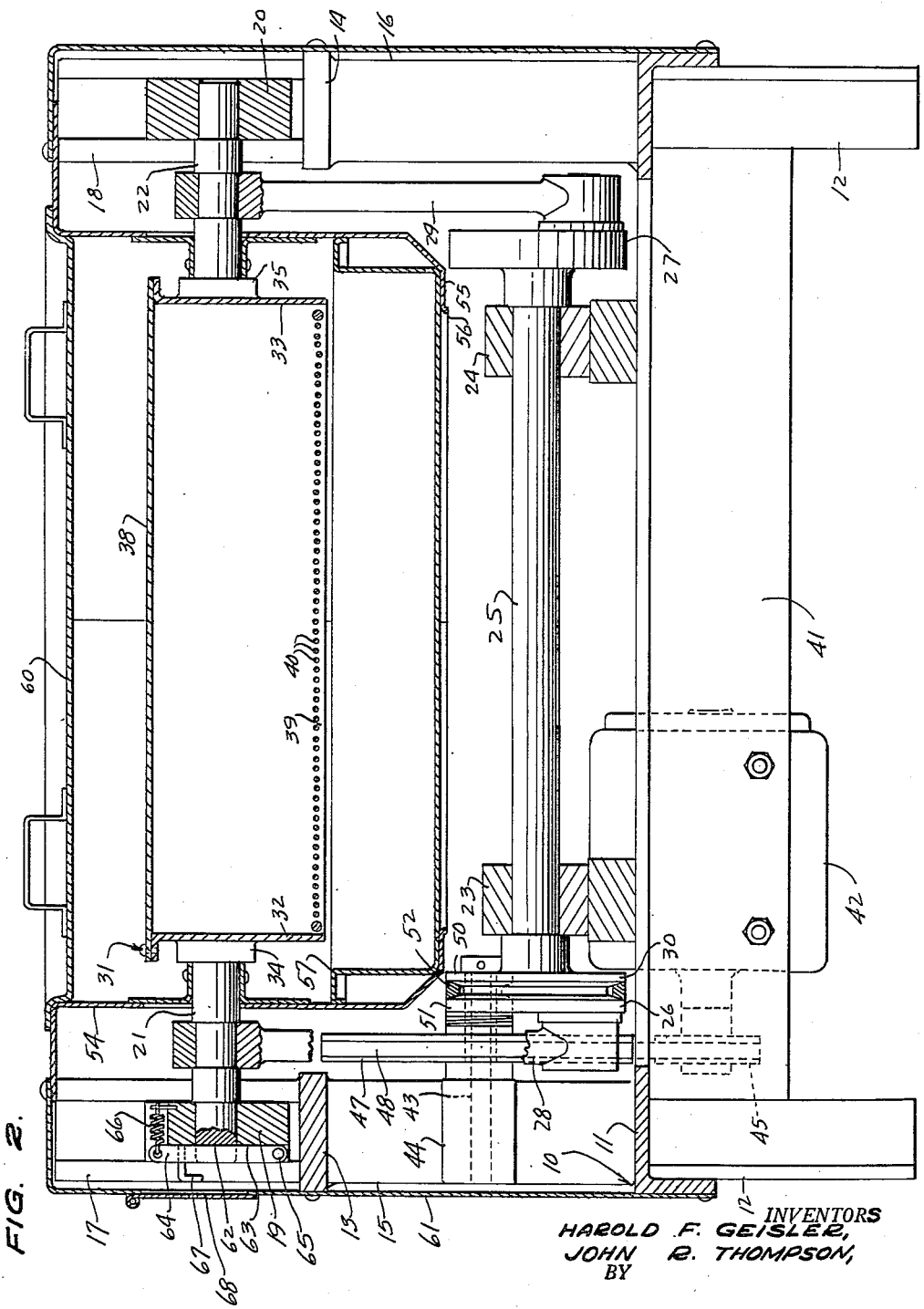

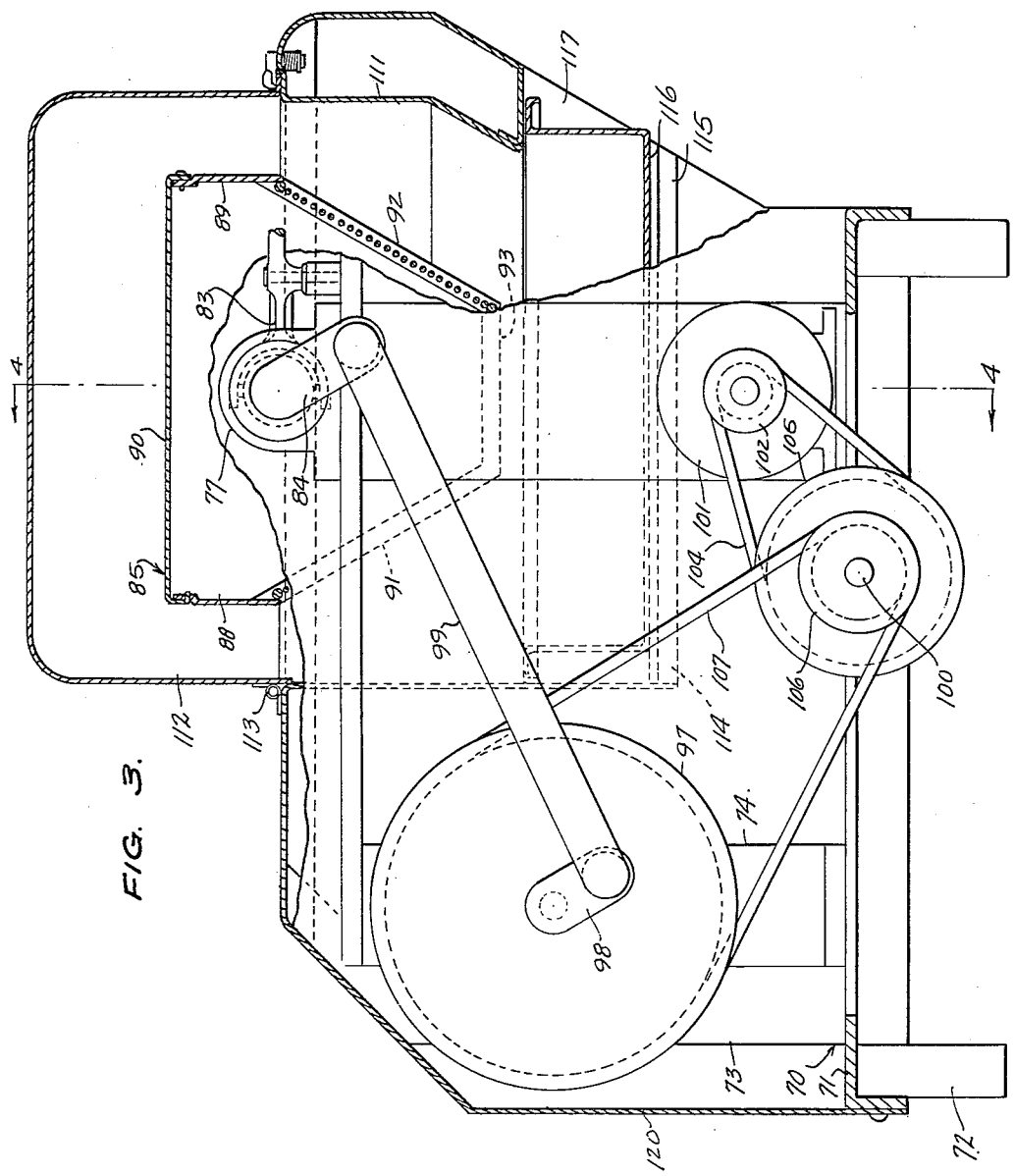

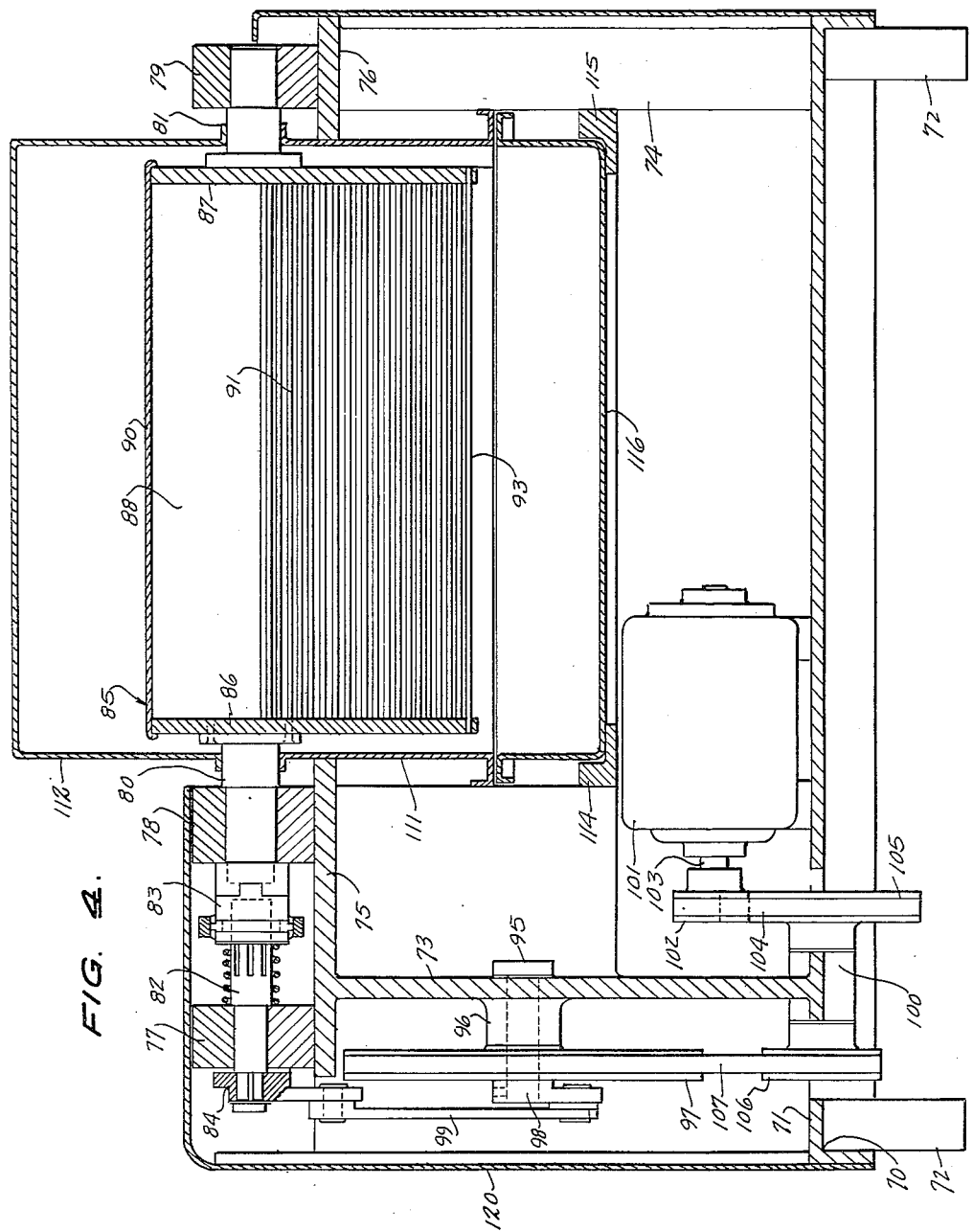

United States Patent Office 2,761,479
Patented Sept. 4, 1956

2,761,479

MEAT RECOVERY APPARATUS FOR COOKED POULTRY NECKS

Harold F. Geisler and John R. Thompson, Tucker, Ga., assignors to Meat Separator Corporation, a corporation of Georgia Application March 31, 1953, Serial No. 345,915

8 Claims. (Cl. 146—76)

This invention relates to material separating machines and more particularly to a machine or apparatus for recovering the meat from poultry necks.

It is among the objects of the invention to provide a power operated machine which will effectively separate the meat from the bones and cartilage of cooked poultry necks; which deposits the meat in comminuted or shredded condition in a receptacle from which the meat is removed for further processing or commercial distribution; which can be operated to discharge accumulated bones and cartilage at selected times; which produces a large quantity of usable meat in proportion to the quantity of material processed; which is easy to clean and sterilize; and which is simple and durable in construction, economical to manufacture, and effective and efficient in operation.

Other objects and advantages will become apparent from a consideration of the following description and the appended claims in conjunction with the accompanying drawings wherein:

Figure 2 is a transverse cross sectional view on the line 2—2 of Figure 1;

Figure 3 is a side elevational view of a somewhat modified form of meat recovery machine; and Figure 4 is a transverse cross sectional view on the line 4—4 of Figure 3.

Figure 1:
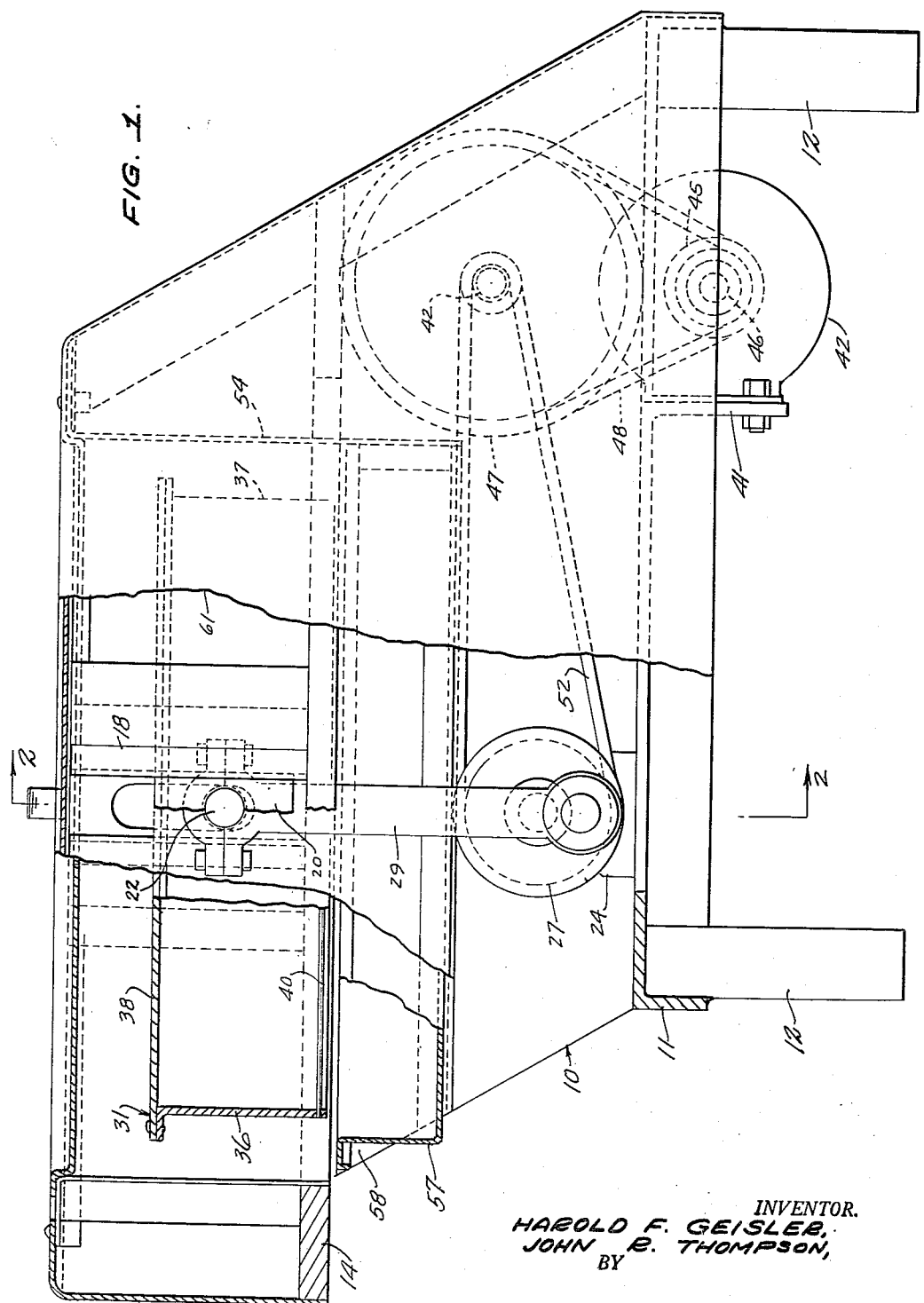
Figure 1 is a side elevational view of a meat recovery machine illustrative of the invention with certain portions broken away and shown in cross section to better illustrate the construction of the machine.

With continued reference to the drawings, and particularly to Figures 1 and 2, the machine comprises a frame, generally indicated at 10, including a base 11 of rectangular shape mounted on the upper ends of four vertically disposed legs 12 arranged one at each corner of the base. Frame side rails 13 and 14 are disposed one at each side of the frame above and parallel to the base 11 and are supported from the base by suitable structures, as indicated at 15 and 16 respectively. Vertically disposed guideways 17 and 18 are mounted on and extend upwardly from the horizontally disposed rails 16 and 17 intermediate the length of the rails, and crossheads 19 and 20 are slidably mounted in the guides 17 and 18 respectively, for vertical reciprocatory movement.

The crossheads 19 and 20 are provided with centrally disposed bearing apertures, and an arbor 21 is journaled at one end in the bearing aperture in the crosshead 19 and extends from the crosshead inwardly of the adjacent side of the machine frame. A similar arbor 22 is journaled at one end in the crosshead 20 and extends from the crosshead inwardly of the adjacent side of the frame, the arbors 21 and 22 having a common axis which is horizontally disposed and extends transversely of the machine.

Bearing pillows 23 and 24 are mounted on the top surface of the base 11 of the machine at locations spaced apart transversely of the machine and a crankshaft 25 is journaled near its opposite ends in the bearing pillows 23 and 24 and is disposed above and substantially parallel to the top surface of the machine base 11. Cranks 26 and 27 are mounted on the crankshaft 25 at the respectively opposite ends of the crankshaft and at the outer sides of the bearing pillows 23 and 24 respectively, and a conecting rod or pitman 28 is journaled at one end on the pin of the crank 26 and journaled at its opposite end on the arbor 21 intermediate the length of this arbor. A connecting rod or pitman 29 is journaled at one end on the pin of the crank 27 and at its other end on the arbor 22 intermediate the length of this arbor and a belt pulley 30 is mounted on the shaft 25 adjacent the crank 26 to rotate the crankshaft.

The pins of the cranks 26 and 27 have their axes substantially in a common plane which also includes the longitudinal center line of the crankshaft 25, so that the pitmans 28 and 29 move up and down simultaneously and coextensively, imparting corresponding vertical reciprocatory movements to the crossheads 19 and 20 and the arbors 21 and 22.

A basket of rectangular shape, generally indicated at 31, is disposed between the inner or mutually adjacent ends of the arbors 21 and 22 and includes vertically disposed side walls 32 and 33 respectively, provided on their outer sides with hollow bosses 34 and 35 respectively, receiving the inner ends of the corresponding arbors 21 and 22. The arbors 21 and 22 are fixed to the side walls of the basket 31, so that the basket cannot tilt about the common, horizontally disposed axis of the arbors without turning the arbors.

The basket has end walls 36 and 37 disposed substantially perpendicular to the side walls 32 and 33 and a flat, top wall 38 detachably secured to the upper edges of the side and end walls of the basket, so that the top wall can be easily removed from the basket when it is desired to discharge an accumulation of bones and cartilage from the basket. The bottom wall 39 of the basket is substantially parallel to the top wall 38 and is in the form of a grating including a plurality of rods 40 extending between the lower edges of the end walls 36 and 37 of the basket substantially perpendicular to these end walls and in spaced apart and substantially parallel relationship to each other. The rods 40 are preferably wire elements having a diameter of approximately three thirty-seconds of an inch and adjacent rods are spaced apart a uniform distance of approximately five thirty-seconds of an inch, this diameter and spacing of the grating rods having been found highly efficient in separating the meat from the bone and cartilage of cooked poultry necks by permitting the meat to slip downwardly through the gratings provided by the rods while the bones and cartilage are held on the top of the gratings.

A motor mounting bracket 41 depends from the base 11 of the machine frame and an electric motor 42 is mounted on one side of this bracket. A jackshaft 43 is disposed above the motor 42 and is secured at one end in a tubular structure 44 which constitutes a portion of the machine frame. A belt pulley 45 is fixed on the motor shaft 46 and a belt pulley 47, larger than the belt pulley 45, is journaled on the jackshaft 43. A belt 48 drivingly connects the pulley 45 on the motor shaft to the pulley 47 and a small belt pulley 50 is journaled on the jackshaft 43 adjacent the pulley 47 and the pulley 47 is drivingly connected to the pulley 50 by a friction clutch 51. A belt 52 drivingly connects the pulley 50 to the belt pulley 30 on the crankshaft 25, so that the crankshaft is rotated by the motor 42 and the basket 31 is vertically reciprocated when the motor 42 is in operation.

The friction clutch 51 prevents any undue strain on the mechanism in the event any of the moving parts of the mechanism should become jammed or stuck while the motor is in operation, and the up and down movement of the basket 31 agitates the cooked poultry neck material in the basket and beats this material against the grating 39 constituting the bottom wall of the basket, so that the meat is separated from the bones and cartilage of the necks and is forced downwardly from the basket through the grating.

An inner housing 54, formed of a suitable material, such as sheet metal, and of generally rectangular shape, is supported in the machine frame 10 in surrounding relationship to the basket 31 and has an open end disposed above and in a plane substantially parallel to the plane of the top wall 38 of the basket and a bottom wall disposed below and in a plane substantially parallel to the bottom wall of the basket.

The bottom wall 55 of the inner housing 54 is provided with an opening, the edge of which is indicated at 56, occupying the major portion of the area of the bottom wall and a flat pan 57 of rectangular shape and also formed of a suitable material, such as sheet metal, is supported on the bottom wall 55 of the inner housing 54 below the basket 31. The pan 57 is movable into and out of the inner housing of the machine through registering openings provided in the inner and outer housings of the machine, as indicated at 58 in Figure 1, so that meat separated from poultry necks in the basket 31 through the bottom grating 39 of the basket will fall into the pan 57 and can be removed from the machine.

A flat cover 60 is removably placed on the open upper end of the inner housing 54 and closes the open end of this inner housing. An outer housing 61, formed of a suitable material, such as sheet metal, encloses the machine frame 10 and provides a neat and attractive appearance for the machine and renders the machine easy to maintain in a clean and sterile condition.

The arbor 21 is provided in its outer end with a diametrically extending groove 62 and the crosshead 19 is provided in its outer side with a vertically disposed groove 63 which normally registers with the groove 62 in the outer end of the arbor 21. A latch lever 64 is disposed in the groove 63 in the crosshead 19 and pivotally connected at one end to the crosshead near the lower end of the crosshead, as indicated at 65. A tension spring 66 connected between the latch lever 64 and the upper end of the crosshead 19 resiliently maintains the latch lever seated in the groove 63 in the crosshead and the diametrical groove 62 in the outer end of the arbor 21, so that the arbor cannot turn relative to the crosshead. A handle 67 projects from the outer side of the latch lever 64 and a hinged door 68 is provided in the outer housing 61 of the machine in covering relationship to the latch lever 64.

By first opening the door 68 and then grasping the handle 67 and pulling the latch lever 64 outwardly against the force of spring 66, the latch lever can be disengaged from the groove 62 at the end of the arbor 21 and the arbors, thereby, freed to turn in the crossheads 19 and 20. When it is desired to remove an accumulation of bones and cartilage or gristle from the basket 31, the latch lever 64 is released from the arbor 21 and the basket is turned upside down over an empty pan 57 disposed below the basket in the inner housing 54 of the machine. The top wall 38 of the basket is then removed and the contents of the basket permitted to fall into the empty pan with which such contents can be removed from the machine for appropriate disposal.

After an accumulation of bones and cartilage has been removed from the pan, the interior of the machine should be thoroughly cleaned and sterilized before the machine is again placed in operation.

The modified form of machine illustrated in Figures 3 and 4 is substantially the same in principle as the machine illustrated in Figures 1 and 2 and described above, the principal difference between the two machines being that, in the first described machine the material agitating movement imparted to the basket is a vertical reciprocatory movement, whereas, in the modified form of the machine, the material agitating movement imparted to the basket is a rocking or oscillating movement about a substantially horizontal, fixed axis.

With reference now to Figures 3 and 4, the machine frame, generally indicated at 70, includes a flat base 71 of rectangular shape supported at its corners on vertically disposed legs 72. Side frame structures 73 and 74 extend upwardly from the base 71 in spaced apart and substantially parallel relationship to each other, and terminate at their upper ends in horizontally disposed side rails 75 and 76 disposed at the respectively opposite sides of the machine.

Bearing pillows 77 and 78 are mounted on the top surface of the side rail 75 in spaced apart relationship to and in alignment with each other and a bearing pillow 79 is mounted on the top surface of the side rail 76 in alignment with the bearing pillows 77 and 78. An arbor 80 is journaled in the bearing pillow 78 and projects therefrom inwardly of the adjacent side of the machine frame and an arbor 81 is journaled in the bearing pillow 79 and projects from this bearing pillow inwardly of the corresponding side of the machine frame. The arbors 80 and 81 have a common, substantially horizontally disposed axis extending transversely of the machine frame, and a stub shaft 82 is journaled in the bearing pillow 77 in alignment with the arbor 80. A manually operated clutch 83 is connected between the stub shaft 82 and the arbor 80 and a crank 84 is secured on the stub shaft 82 at the side of the bearing pillow 77 remote from the bearing pillow 78.

A basket, generally indicated at 85, is disposed between the inner or mutually adjacent ends of the arbors 80 and 81 and has spaced apart and substantially parallel end walls 86 and 87 secured to the adjacent ends of the arbors 80 and 81 respectively.

The basket 85 also has spaced apart and substantially parallel upper side walls 88 and 89, a flat top wall 90 disposed on the top edges of the upper side walls 88 and 89 and the end walls 86 and 87 and releasably connected to the side walls, so that it can be removed from the basket, when desired, convergently disposed lower side walls 91 and 92 and a bottom wall 93 disposed between the bottom edges of the lower side walls 91 and 92 and substantially parallel to the top wall 90.

The lower side walls 91 and 92 and the bottom wall 93 of the basket are in the form of gratings constituted by spaced apart and substantially parallel rods extending longitudinally of the basket between the end walls 86 and 87. As in the above described form of the invention, the gratings are preferably formed by metal rods of approximately one eighth inch diameter with adjacent rods spaced apart a uniform distance of approximately five thirty-seconds of an inch.

An axle pin 95 extends through and is secured in a boss 96 projecting from one side of the side frame structure 73 of the machine below the corresponding top rail 75 and a large belt pulley 97 is journaled on the axle pin 95 at the outer end of the boss 96. A crank 98 is journaled on the axle pin 95 and secured to the belt pulley 97 and a connecting or link rod 99 connects the crank 98 to the crank 84 on the stub shaft 82.

A jackshaft 100 is journaled on the frame base 71 and an electric motor 101 is mounted on the base adjacent the jackshaft 100. A belt pulley 102 on the motor shaft 103 is drivingly connected by a belt 104 to a belt pulley 105, larger than the belt pulley 102, mounted on the jackshaft 100. A belt pulley 106, smaller than the belt pulley 97, is mounted on the jackshaft 100 and connected by a belt 107 to the pulley 97 to rotate the crank 98.

When the crank 98 is rotated, the link rod 99 imparts an oscillating movement through the crank 84 to the stub shaft 82 and this oscillating movement of the stub shaft is transmitted through the clutch 83 and arbor 80 to the basket 85, so that the basket is oscillated or rocked about the axis of the arbors 80 and 81. This oscillating or rocking movement of the basket agitates poultry neck material in the basket and causes the meat portion of the poultry necks to be forced out of the basket through the gratings 91, 92 and 93, while the bone and gristle content of the poultry necks is retained in the basket. The agitation of the material in the basket is of sufficient violence to impact the material against the wires of the basket and dislodge the flesh from the bones of the poultry necks.

The modified machine is provided with an inner housing 110 of rectangular shape enclosing the basket 85 and including a hood portion 112 extending over the top of the basket and hinged along one edge to the lower portion of the inner housing, as indicated at 113. The upper and lower ends of the inner housing 110 are open, and track rails 114 and 115 are mounted on the frame side structures 73 and 74 respectively, below the bottom wall or grating 93 of the basket 85.

A flat pan or receptacle 116 is slidably supported on the rails 114 and 115 below the basket 85 and is movable into and out of the machine through an opening 117 provided in the outer housing of the machine below the lower open end of the inner housing 110.

When it is desired to remove an accumulation of bone and cartilage material from the basket 85, the clutch 83 is manually released and the basket turned to an inverted position over an empty pan 116. The top cover 90 of the basket is then removed and the contents of the basket dumped into the empty pan and removed with the pan from the machine for suitable disposal.

The modified machine also has an outer housing 120 formed of suitable material, such as sheet metal, enclosing the frame of the machine, and the inner housing 110, giving the machine an attractive appearance and rendering it easy to maintain in a clean and sterile condition.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. Apparatus for recovering meat from objects such as whole cooked poultry necks comprising a frame, a basket movably mounted in said frame and having a bottom wall including a grating arranged to permit the passage of meat while precluding the passage of bones and cartilage therethrough, a receptacle removably supported in said frame below said basket, and power means mounted on said frame and drivingly connected to said basket imparting to said basket movements with a suddenness of change of movement sufficient to produce violent impact of the material with said basket, said basket having a removable top wall and said power means being disconnectible from said basket whereby said basket is releasable for movement independently of said power means and can be inverted to dump material therefrom when said top wall has been removed.

2. Apparatus for recovering meat from objects such as whole cooked chicken necks comprising a frame, pillow bearings mounted on said frame, arbors journaled in said pillow bearings and having a common axis, a basket disposed between and mounted on said arbors and having in its lower portion a wall including a grating arranged to permit the passage of meat while precluding the passage of bones and cartilage therethrough, a receptacle removably supported in said frame below said basket, and power means mounted on said frame and drivingly connected to at least one of said arbors imparting to said basket movements agitating material disposed in said basket, said power means including clutch means for releasing said basket for movement independently of said power means whereby said basket can be inverted to discharge material therefrom.

3. In combination a frame, arbors journaled on said frame and having a common axis, a basket disposed between and mounted on said arbors and having a wall including grating arranged to permit the passage of certain material while precluding the passage of harder material therethrough, a receptacle supported in said frame below said basket and power means connected to impart to said basket movements with a suddenness of change of movement sufficient to produce violent impact of the material with said basket, and clutch means for releasing said basket from said driving means to permit material to be inserted in and removed from said basket.

4. A device of the character described comprising a container for material to be separated, said container having an impact portion, said container having discharge areas through which the softer material may pass but precluding the passage of the harder material, supporting bearings mounting said container so that it may have limited upward and downward movement in a generally straight line, a substantially vertically disposed connecting rod operatively connected to said container for producing such up and down movement thereof in a rapid manner and with sufficient velocity to cause violent impact between the container and the material therein in order to loosen and produce separation thereof.

5. Apparatus for treating materials having portions of different degrees of hardness for separating such portions comprising a container for material to be separated, said container having an impact portion, said container having discharge areas through which the softer material may pass but precluding the passage of the harder material, supporting bearings for mounting said container so that it may have limited up and down movement in a generally straight line, and actuating means for imparting rapid up and down movement of said container and sudden change of direction of such movement in a manner to produce violent impact between the container and the material contained and to promote separation of the portions of the material of different degrees of hardness.

6. Apparatus for treating material having portions of different degrees of hardness for separating part of the material from another part comprising a container for material to be treated, said container having an impact portion, said container having discharge areas through which the softer of the treated material may pass but precluding the passage of the harder material, supporting means on opposite sides of said container having an axis movable in a plane transverse to said container, and actuating means operatively connected for producing rapid bodily movement in a generally straight line and change of direction of said container and at sufficient velocity to produce violent impact between the container and the material contained to facilitate separation of the material therein.

7. Apparatus for treating material having portions of different degrees of hardness for producing separation of such portions, comprising a container for material to be treated, said container having an impact portion, said container having discharge areas through which the softer of the treated material may pass but precluding the passage of the harder material, supporting means for said container constructed to allow movement bodily in a substantially straight line in one direction and then bodily in a reverse direction, and actuating means operatively connected for producing rapid movement and change of direction of said container and at sufficient velocity to produce violent impact between the container and the material contained to facilitate separation of the material therein.

8. Apparatus for treating materials having portions of different degrees of hardness for producing separation of such portions comprising a container for material to be treated, said container having impact portion and discharge areas through which the softer material may pass but precluding the passage of the harder material, supporting means for said container constructed to allow generally straight line movement in one direction and then reversal of such movement, and actuating means operatively connected for producing rapid movement and change of the directions of movement of said container and at a velocity sufficient to produce violent impact between said container and the material contained to cause separation of such material, and dumping release mechanism operatively associated with said container and permitting the latter to be rocked on said supporting means for dumping its contents.

References Cited in the file of this patent

UNITED STATES PATENTS

| | | |
|---|---|---|
| 696,056 | Lamm | Mar. 25, 1902 |
| 873,049 | Irving | Dec. 10, 1907 |
| 1,308,963 | Stern | July 8, 1919 |
| 1,351,631 | Elkins | Aug. 31, 1920 |

FOREIGN PATENTS

| | | |
|---|---|---|
| 645,394 | Great Britain | Nov. 1, 1950 |